United States Patent [19]

Berger

[11] Patent Number: 4,595,366
[45] Date of Patent: Jun. 17, 1986

[54] WINDSURF SIMULATOR

[76] Inventor: Pierre Berger, La Mole, 83310 Cogolin, France

[21] Appl. No.: 572,651

[22] Filed: Jan. 17, 1984

[30] Foreign Application Priority Data

Jan. 18, 1983 [FR] France .................. 83 00670

[51] Int. Cl.⁴ ............................................. G09B 9/06
[52] U.S. Cl. ..................................................... 434/60
[58] Field of Search ........................................ 434/60

[56] References Cited

U.S. PATENT DOCUMENTS 4,021,934 5/1977 Taylor .................................. 434/60
4,436,513 3/1984 Darby .................................. 434/60
4,449,940 5/1984 Berger ................................. 434/60

FOREIGN PATENT DOCUMENTS 52051  5/1982 European Pat. Off. ............ 434/60
1500889 11/1967 France .
1566239  5/1969 France .
2504710 10/1982 France .

Primary Examiner—William H. Grieb
Attorney, Agent, or Firm—Sandler & Greenblum

[57] ABSTRACT

A simulator including a pedestal in the form of a receptacle and a platform rotatably mounted on the pedestal. The platform includes means for receiving a sail mast. The rotation of the platform with respect to the pedestal is dampened by damping means.

17 Claims, 5 Drawing Figures

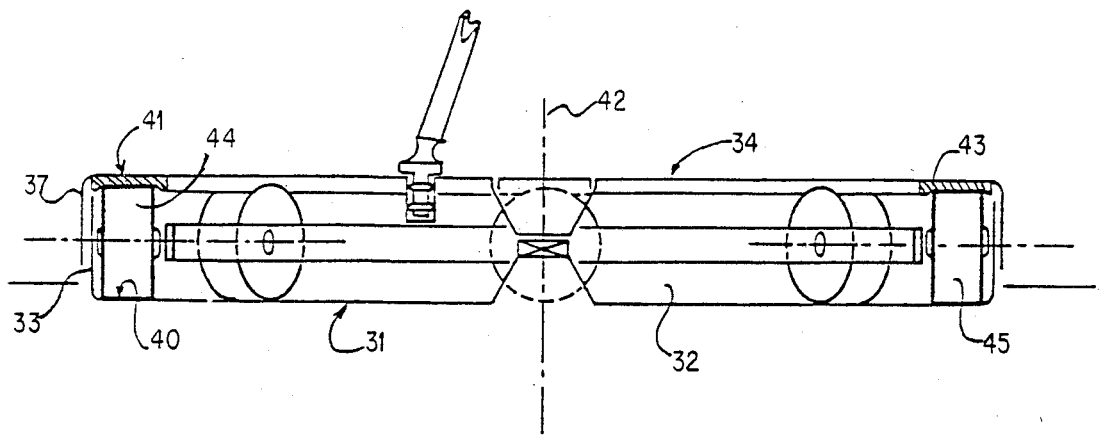
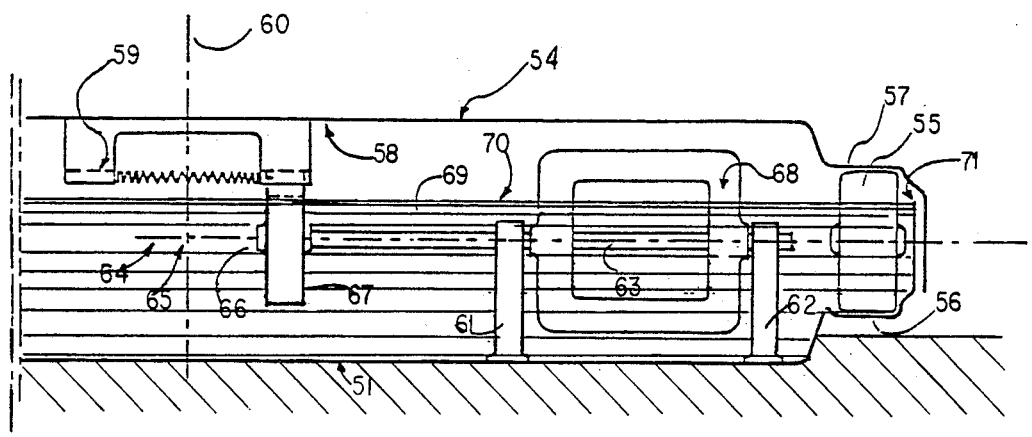
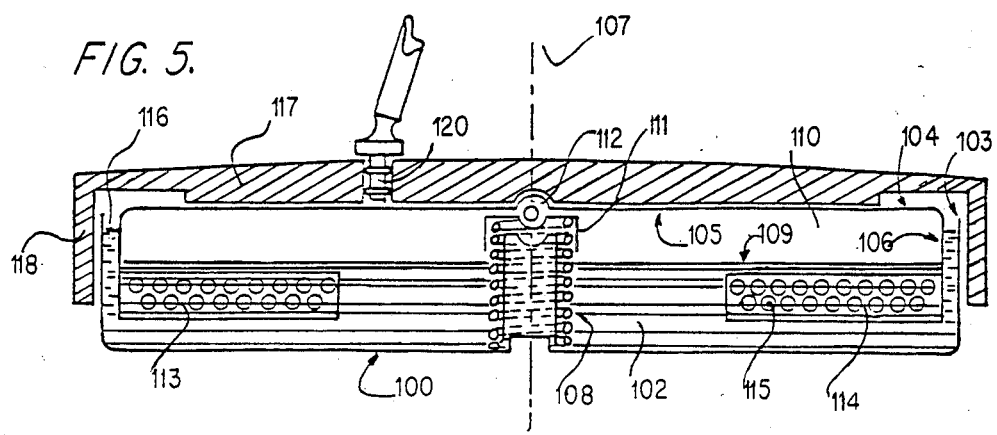

WINDSURF SIMULATOR

BACKGROUND OF THE INVENTION

The present invention relates to windsurf simulators. It is known that a windsurf simulator is an apparatus which makes it possible to learn to maneuver windsurfing sports apparatus on dry land. Numerous simulation apparatus exist which make it possible to teach beginners the maneuvering of a windsurf board. The Applicant particularly has filed patent applications for such apparatus.

These apparatus provide complete satisfaction, because they perfectly reproduce all possible movements which occur with a windsurf board when it is in its liquid element. However, although these apparatus give excellent results, they are generally costly and burdensome, and therefore of limited application and use.

SUMMARY OF THE INVENTION

The present invention is a windsurf simulator which provides the essential movements to which one is subjected when one is on a windsurf board, but whose structure and design make it possible to make apparatus which are inexpensive and thus accessible to a greater number of people. More precisely, the present invention is a windsurf simulator comprising the following elements:

a platform situated above said pedestal, said platform comprising means for receiving a sail mast, support and roller means of said platform with respect to said pedestal around an axis, and means for damping the rotation of said platform with respect to said pedestal, by friction of an element which is integral with respect to a body having a predetermined coefficient of viscosity.

Other characteristics and advantages of the present invention will become clear from the following description with respect to the annexed drawings, which are given by way of illustration, and not limitation.

BRIEF DESCRIPTION OF THE DRAWINGS

FIG. 3 is a vertical sectional view of the second embodiment of the windsurf simulator.

FIG. 4 is a vertical sectional view of the third embodiment of the windsurf simulator.

FIG. 5 is a vertical sectional view of the fourth embodiment of the windsurf simulator.

DETAILED DESCRIPTION OF THE PREFERRED EMBODIMENTS

Figure 1:
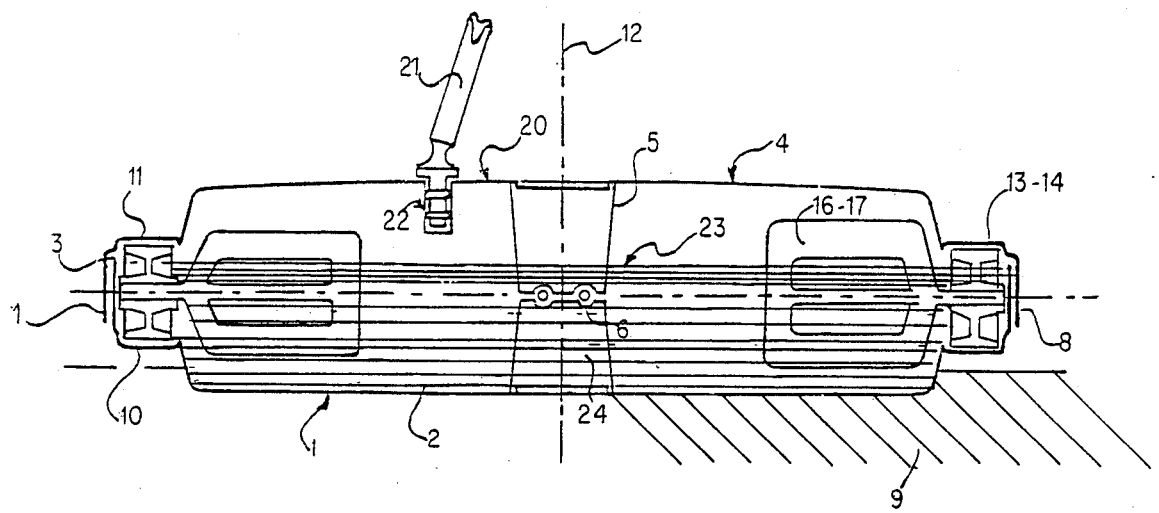
FIG. 1 is a vertical sectional view of the first embodiment of the windsurf simulator.
Figure 2:
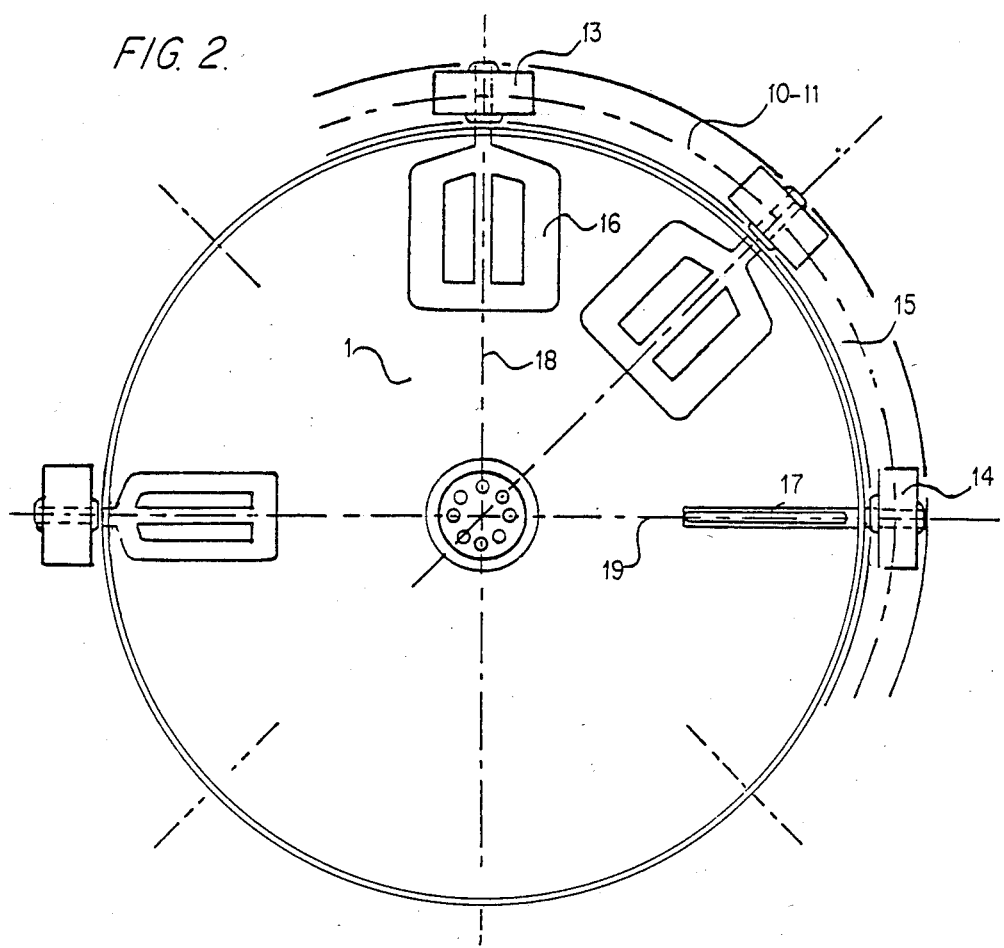
FIG. 2 is a top plan view of the first embodiment of the windsurf simulator.

FIGS. 1 and 2 illustrate along two perpendicular views a first embodiment of a windsurf simulator. Pedestal 1 is in the form of receptacle 2, which can contain a certain quantity of fluid having a predetermined coefficient of viscosity, as for example water. The maximum quantity of fluid which receptacle 2 can contain is defined by its upper level, which can go up to upper edge 3.

Platform 4 comprises central bearing shaft 5 cooperating with base 24 by such means as ball bearings 6. The bottom of base 24 is integral with the bottom of receptacle 2. The outside diameter of platform 4 is greater than the outside diameter of the receptacle, such that lower edge 7 covers edge 3 of pedestal 1 and descends to level 8 below the level of edge 3 when pedestal 1 is positioned on ground 9.

Horizontal lateral edges 10 and 11 of pedestal 1 and platform 4, respectively, together constitute an annular roller path centered on axis 12 and situated in a plane perpendicular to axis 12.

Between pedestal 1 and platform 4 are positioned a plurality of rollers 13 and 14 rolling simultaneously on lateral edges 10 and 11. The rollers serve to maintain and support the edge of platform 4 with respect to pedestal 1. All of these rollers 13 and 14 are connected among themselves by chassis 15. Chassis 15 serves to maintain the rollers at a substantially constant distance with respect to one another, and furthermore to constantly keep them on the roller path.

The chassis is preferably a solid tubular frame; if lateral edges 10 and 11 are in such a shape, such as that of a basin, which will keep the rollers in the path, the chassis may be comprised of straps of relatively flexible material.

It should be noted that upper edge 3 of pedestal 1 is at a higher level than roller path 10; nevertheless, the vertical distance from roller path 10 to upper edge 3 is slightly less than the diameters of rollers 13 and 14, such that when platform 4 is moved in rotation around axis 12, roller path 11 can come into contact with the cylindrical revolution edges of rollers 13 and 14 without obstacle and thus be able to turn with respect to pedestal 1 without friction on the upper peak of edge 3.

The simulator furthermore can comprise at least one of blades 16 and 17. Preferably, each blade 16 and 17 is integral with a roller along common axes of rotation 18 and 19, respectively, such axes being perpendicular to rotation axis 12 of platform 4 with respect to pedestal 1, such that when the rollers are caused to rotate by the rotation of the platform with respect to pedestal 1, each blade rotates in a plane of rotation parallel to that of its roller.

Exterior surface 20 of platform 4 provides an area where a potential user can place his feet, and includes support means, such as opening 22, for a sail mast, such as that seen in part at 21.

The embodiment of the simulator described above functions in the following manner:

First, one fills receptacle 2 of pedestal 1 with water, which can reach upper level 23 defined by the upper level of edge 3.

When the user mounts platform 4 and holds a windsurf sail rigging, and more particularly the "wishbone" under the action of the wind, platform 4 is moved in rotation around axis 12. The pivoting of platform 4 with respect to pedestal 1 causes rollers 13 and 14, which move on roller paths 10 and 11, to rotate. By their rotational movements, the rollers cause the rotation of blades 16 and 17, which then "submerge" in the fluid, which may be water, entirely or partially, as a function of their width and of the fluid level 23. This rotation serves to damp the rotation of platform 4 with respect to fixed pedestal 1 because the pedestal is resting on ground 9.

This "submerging" of blades 16 and 17 in the liquid thus allows for hydraulic damping of platform 4 with respect to pedestal 1. This damping is substantially equivalent to the braking which occurs on a windsurf board when it is in its natural element, i.e., on the water.

It is thus seen that this windsurf simulator, though simply designed and inexpensive, nevertheless provides a sufficiently good impression of the movements of a windsurf board on the water.

FIG. 3 illustrates a second embodiment of the windsurf simulator in a longitudinal cross-section view, this single view being sufficiently explicit in itself to portray its entire structure. This simulator comprises pedestal 31 forming receptacle 32, on which is positioned platform 34, whose edge exteriorly covers edge 33 of pedestal 31. Pedestal 31 and platform 34 respectively comprise, as in the preceding embodiment, lateral edges 40 and 41, which form an annular roller path centered on axis 42. In this embodiment, however, instead of the viscous fluid used for damping in the first embodiment, at least one band 43 is positioned on at least one of the two roller paths, preferably on upper roller path 41. This band is made of a material which has a coefficient of viscosity and may also be deformable. For example, this material can be an elastomer.

Under these conditions, when a user positions himself on platform 34 and the platform undergoes rotational movements identical to those described with respect to the first embodiment, rollers 44 and 45, which have the same cooperative structure as the rollers illustrated in FIG. 2, respectively roll on two roller paths 40 and 41. However, the deformable nature of roller band 43 causes the roller to penetrate into this material to deform it. This deformation damps the rotation of the rollers, and thus rotation of platform 34, with respect to pedestal 31.

As a result, one obtains the same damping effect as that described above for the first embodiment, i.e., that of a windsurf apparatus when it is in its natural element.

FIG. 4 illustrates a third embodiment of a windsurf simulator which comprises, as in the preceding embodiments, pedestal 51 and platform 54, which can pivot with respect to one another by means of rollers 55 respectively cooperating with lateral edges 56 and 57, respectively belonging on pedestal 51 and platform 54.

This embodiment, as in the first embodiment, according to FIGS. 1 and 2, comprises pedestal 51 in the configuration of a receptacle to contain a fluid having a coefficient of viscosity. However, in this embodiment, platform 54 is integral on its interior surface 58 with circular gear 59. Circular gear 59 lies in a plane perpendicular to axis of rotation 60 of plane 54. Integral with receptacle 51 are situated two bearing carriers 61 and 62, which support axis 63. Axis 63 is positioned on line 64, which, for mechanical purposes, preferably is perpendicular to axis 60 and intersects axis 60 at point 65. End 66 of axis 63 is integral with gear 67, which is situated in a plane perpendicular to line 64 and is cooperably associated with gear 59.

Rotation of platform 54 around axis 60 causes gear 59 to cooperate with gear 67; gear 67 transforms the rotational movement of platform 54 into a rotational movement of axis 63 around axis 64. Axis 63 is also integral with blade 68 along the common axis of rotation, such that rotation of axis 63 causes blade 68 to rotate in a plane of rotation parallel to that of axis 63. Blade 68 may be positioned between bearing carriers 61 and 62. While only a single blade is illustrated, a plurality may be present.

When pedestal 51 is filled with viscous fluid 69 to level 70, which can be defined by upper edge 71 of pedestal 51, rotation of blade 68 will submerge the blade in the viscous fluid.

In the embodiments described above, the rotational movements of the platform with respect to the pedestal are facilitated by central bearings and/or rollers 13, 14, 45, 55. But it can be advantageous, in certain cases, to eliminate these rollers to further contribute to a reduction of the cost of production of such a simulator.

FIG. 5 allows for such a preferred rotation. In this embodiment, the windsurf simulator comprises pedestal 100, of a predetermined diameter, in the form of receptacle 102 for containing a viscous fluid such as water, whose quantity is defined by the level of upper edge 103. It comprises, furthermore, platform 104 in the shape of an upside-down basin defined by bottom 105 and by circular lateral edge 106 of a diameter slightly less than the interior diameter of receptacle 102. Platform 104 can thus penetrate into receptacle 102, such that edge 103 of pedestal 101 exteriorly surrounds edge 106 of platform 104.

Pedestal 100 and platform 104 preferably are cylindrical in shape, are rotatably associated, and are positioned one inside the other along axis 107. They can be maintained in face-to-face configuration by means of bearing shaft spring 108, centered on axis 107. When a quantity of viscous fluid is placed in receptacle 102, placing platform 104 in pedestal 100 forms sealed chamber 110 containing air between upper level 109 of the viscous fluid and bottom 105 of platform 104. Chamber 110 thus constitutes an air cushion or air chamber forming a fluidic spring like those which are found in shock absorbers. As a result, platform 104 is supported on an elastic mattress of compressible fluid, and can thus pivot with respect to pedestal 100 with a minimum of friction.

To this elastic air chamber can be added the supplemental elastic force resulting from spring 108. Spring 108 is fixed with respect to pedestal 100 but cooperates by means of cap 111 and ball bearings 112 with platform 104 to allow for the rotation of this platform with respect to pedestal 100. At least one of plates 113 and 114, preferably having a plurality of orifices 115, is integral with edge 106 and extends into the interior of receptacle 102.

As a result, when platform 104 is rotated with respect to pedestal 100 particularly by virtue of a cushion of air, plates 113 and 114 displace in the fluid, laminating it in orifices 115 to obtain the shock absorption of the rotation of platform 104 with respect to pedestal 100 and thus the hydraulic damping explained above.

To prevent impurities such as gravel from entering receptacle 102 through space 116, cover 117, having curved edge 118 with a diameter greater than edge 103 of pedestal 100, preferably is attached to platform 104. Cover 117 can itself comprise means 120 for supporting the support means (in the direction of attachment) of a windsurf board.

I claim:
1. A windsurf simulator comprising:
(a) A pedestal;
(b) A platform rotatably mounted on the pedestal, said platform comprising means for receiving a sail mast;
(c) support means interposed between said platform and said pedestal, said support means comprising a plurality of rollers interposed between said pedestal and said platform, said rollers being adapted to roll as said platform rotates on said pedestal and said rollers comprising damping means for damping the rotation of said platform relative to said pedestal.

2. The simulator as defined in claim 1 wherein said pedestal is in the form of a receptacle for receiving a damping fluid therein.

3. The simulator as defined by claim 2 wherein said support means further comprises a blade secured to each of said rollers, said blade being secured to rotate in said fluid as said rollers roll whereby the rolling of said rollers is hindered by said fluid.

4. The simulator as defined by claim 3 wherein each of said blades is apertured.

5. The simulator as defined by claim 3 wherein each of said rollers is held within a frame so as to maintain said rollers at a substantially constant distance with respect to one another.

6. The simulator as defined by claim 5 wherein each of said rollers moves within a roller path.

7. The simulator of claim 1 wherein said damping means comprises at least one blade rotatably associated with the platform whereby rotation of said platform causes said at least one blade to move against a frictional drag.

8. The simulator as defined by claim 7 wherein said platform is operably associated with a pedestal gear associated with said at least one blade to rotate said at least one blade against a fluid in said pedestal.

9. The simulator as defined by claim 8 wherein said at least one blade is rotatably mounted on said pedestal, and is rotated by an axis associated with said pedestal gear.

10. The simulator as defined by claim 8 further comprising a platform gear mounted beneath said platform which rotates said pedestal gear as said platform rotates.

11. The simulator as defined by claim 9 wherein said rollers move in a roller path and said damping means comprises an elastically deformable material along said roller path to dampen the rotational movement of said platform relative to said pedestal.

12. A windsurf simulator comprising:
(a) a pedestal;
(b) a platform rotatably mounted on the pedestal, said platform comprising means for receiving a sail mast;
(c) support means interposed between said platform and said pedestal, said support means comprising damping means for damping the rotation of said platform relative to said pedestal, said damping means comprising at least one blade rotatably associated with the platform whereby rotation of said platform causes said at least one blade to move against a frictional drag, and said at least one blade is in the form of a plate secured to the lateral edge downwardly depending from said platform.

13. The simulator as defined by claim 12 wherein said plates each comprises a plurality of orifices therein.

14. The simulator as defined by claim 13 wherein said pedestal is filled with liquid to a level sufficient to immerse said plates therein.

15. The simulator as defined by claim 14 further comprising a cover on top of said platform, said cover comprising a lateral portion extending downwardly therefrom, over the upstanding lateral portion of said pedestal to prevent the entrance of gravel and the like.

16. The simulator as defined by claim 15 wherein said pedestal is only partially filled with liquid to provide an air cushion between said platform and said pedestal to dampen the vertical movement of said platform relative to said pedestal.

17. The simulator as defined by claim 16 further comprising a spring between said platform and said pedestal to further dampen the vertical movement of said platform relative to said pedestal.

* * * * *